Patented Feb. 22, 1949

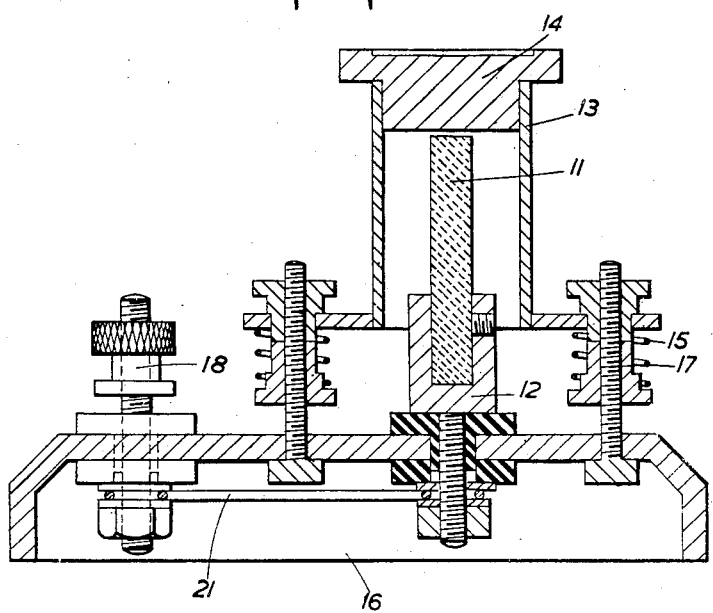
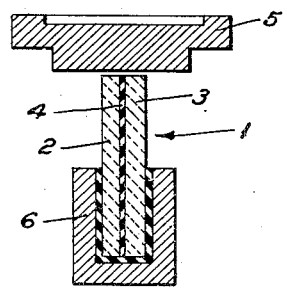

2,462,148

UNITED STATES PATENT OFFICE 2,462,148

ELECTRIC SOLDERING APPARATUS

George Louie Ward, Northwood, England, assignor, by mesne assignments, to International Standard Electric Corporation, New York, N. Y., a corporation of Delaware Application June 10, 1943, Serial No. 490,246
In Great Britain July 17, 1942

4 Claims. (Cl. 219—12)

This invention relates to electric soldering devices.

Difficulty is frequently experienced in soldering parts made from light gauge metal, and in soldering metal gauze, such as used on filters owing to the occurrence of burning and overheating. The object of the present invention is to overcome such difficulties.

One embodiment of the invention is schematically shown in Fig. 1. It consists of a short length of carbon tube 1 which in known manner is slit to form two half sections 2, 3, insulated at 4 mounted on end in a suitable carbon holder 6. The carbons are used as positive and negative respectively. The top ends of the carbons are shrouded with copper in the form of a plate or disc, or in any shape to conform with the parts be be soldered, and forms a soldering plate. The requisite soldering temperature is attaind when the carbons are in contact either through the soldering plate 5, or a special jig forming a soldering plate 5, or by direct contact of the parts to be soldered with the top ends of the vertical carbons 2, 3.

When desired, a foot switch (not shown) may be provided for breaking the circuit of the mains supply.

A second embodiment of the invention is shown in Fig. 2 of the accompanying drawing, being a sectional elevation.

As shown, a short length of carbon rod 11 is mounted in a carbon holder 12 to which a conductor 21 is connected. The carbon is protected by a metal tube 13, at the end of which is mounted a plate or disc 14 of copper or other suitable metal to form a soldering plate. This plate can be made in various sizes and shapes to suit the parts to be soldered. The housing 13 supporting the soldering plate 14 is mounted so that the under side of the plate is not normally in contact with the carbon rod. The soldering plate forms one electrode and the carbon rod the other electrode. The housing is spring loaded as by springs 15 so that the soldering plate makes contact with the carbon rod when slight pressure is applied, such as when an operator places the part to be soldered on the soldering plate. The base 16 of the tool is fitted with adjustable screws 17 so that the gap between the top of the electrode 11 and the other side of the soldering plate 14, can be adjusted to take up wear of the carbon.

The base 16 of the tool is fitted with connecting terminals 18 for connecting up by cables to the secondary side of a feed transformer.

With such an arrangement, the proper heating temperature is quickly attained and maintained, but the burning of the parts to be soldered, which would otherwise occur by the intense heat generated by carbon electrodes, is eliminated through the shrouding or screening as described above.

The embodiment illustrated is intended more particularly for soldering on long running production jobs where the circuit is closed and open for short periods; in some cases this may be approximately 3 to 5 seconds. Therefore, with this method the requisite temperature is maintained in the soldering plate, notwithstanding the fact that the circuit is intermittently broken, and by this means, the burning of the soldering plate is reduced to a minimum.

What I claim is:

1. A soldering device comprising a base, a carbon heating electrode insulated from and fixedly supported on the base, a shroud of heat conducting material formed to provide an enlarged area soldering plate electrode positioned over the heating element, means for yieldingly supporting the shroud on the base in normally spaced relation to the heating electrode to be depressible by the work into circuit closing and heating engagement with the heating electrode and circuit connections to the electrodes.

2. A soldering device comprising a base, a carbon heating electrode insulated from and fixedly supported on the base, a shroud of heat conducting material formed to provide an enlarged area soldering plate electrode positioned over the heating element, means for yieldingly supporting the shroud on the base in normally spaced relation to the heating electrode to be depressible by the work into circuit closing and heating engagement with the heating electrode and circuit connections to the electrodes and said shroud supporting means being adjustable to vary the normal spaced relation of the electrodes.

3. A hot work table adapted to the soldering of relatively fragile things comprising a metal soldering plate of massive section, a support for the soldering plate, a base, springs mounting the support on the base, a carbon rod supported by the base beneath the plate in position such that pressure applied to the plate will bring it into contact with the rod, said plate and rod being elements of an electrical circuit.

4. A hot work table adapted to the soldering of relatively fragile things comprising a metal soldering plate of massive section and a spaced carbon rod connected in an electrical circuit, and spring means to support the plate for movement into contact with the rod to complete the circuit.

GEORGE LOUIE WARD.

REFERENCES CITED

The following references are of record in the file of this patent:

UNITED STATES PATENTS

| Number | Name | Date |
|---|---|---|
| 452,056 | Zipernowsky | May 12, 1891 |
| 2,244,576 | Schnebelen | June 3, 1941 |
| 2,260,030 | Hurst | Oct. 21, 1941 |